United States Patent [19]

Mattelmäki

[11] Patent Number: 5,366,716
[45] Date of Patent: Nov. 22, 1994

[54] METHOD FOR RECOVERING SULPHUR DIOXIDE FROM THE CHEMICAL CIRCULATION OF A SULPHATE PULP MILL

[75] Inventor: Esko Mattelmäki, Varkaus, Finland

[73] Assignee: A. Ahlstrom Corporation, Noormarkku, Finland

[21] Appl. No.: 983,160

[22] Filed: Nov. 30, 1992

[30] Foreign Application Priority Data

Dec. 2, 1991 [FI] Finland .................. 915672

[51] Int. Cl.⁵ .......................................... C01B 17/48
[52] U.S. Cl. .................. 423/539; 423/243.09; 423/243.11; 423/519; 162/29; 162/51; 159/45; 159/49; 159/DIG. 8
[58] Field of Search ............ 23/302 T; 162/29, 30.1, 162/30.11, 14, 15, 51; 423/243.09, 243.11, 519, 539; 159/49, DIG. 38, 48.1, DIG. 8, 45

[56] References Cited

U.S. PATENT DOCUMENTS

| | | | |
|---|---|---|---|
| 3,485,581 | 12/1969 | Miller et al. | 23/178 |
| 3,607,037 | 9/1971 | Terrana et al. | 23/2 |
| 4,076,576 | 2/1978 | Marttala | 159/17.1 |
| 4,193,837 | 3/1980 | Wyss et al. | 159/24.1 |
| 4,329,198 | 5/1982 | Standiford | 159/6 R |
| 4,483,740 | 11/1984 | Parkinson et al. | 423/551 |
| 4,885,148 | 12/1989 | Erickson et al. | 423/308 |
| 4,897,157 | 1/1990 | Elmore et al. | 162/47 |
| 4,925,526 | 5/1990 | Harukainen | 159/49 |
| 4,944,839 | 7/1990 | Rosenblad | 159/49 |

FOREIGN PATENT DOCUMENTS

| | | | |
|---|---|---|---|
| 988662 | 5/1976 | Canada . | |
| 2433963 | 5/1978 | France | 159/24.3 |

OTHER PUBLICATIONS

Rapson et al., "The Effluent-Free Bleaching Kraft Pulp Mill", Sep. 1973, Tappi, vol. 56, No. 9, pp. 112-115.

Primary Examiner—W. Gary Jones
Assistant Examiner—Dean T. Nguyen
Attorney, Agent, or Firm—Nixon & Vanderhye

[57] ABSTRACT

Sulphur dioxide is separated from the flue gases of a cellulose pulp mill by absorbing it into a sodium sulphite solution. Sulphur dioxide is regenerated from the sodium bisulphite solution produced by an evaporation-crystallization method utilizing thermo-compressor evaporation technique. A lamella evaporator is utilized as the evaporator-crystallizer, the evaporator being divided into separate compartments for ease of cleaning the lamella surfaces. The recovered concentrated sulphur dioxide can be used wherever desired, for example for the production of chlorine dioxide.

9 Claims, 1 Drawing Sheet

METHOD FOR RECOVERING SULPHUR DIOXIDE FROM THE CHEMICAL CIRCULATION OF A SULPHATE PULP MILL

BACKGROUND AND SUMMARY OF THE INVENTION

In sulphate cooking of wood in the production of cellulose (paper) pulp, the wood is treated with white liquor containing NaOH and NaS2, whereby lignin is hydrolyzed. This reaction produces several organic sulphur compounds, such as methyl mercaptan, dimethyl sulphide and dimethyl disulphide. These compounds, in addition to hydrogen sulphide, cause the unpleasant odor of the pulp mill off gases. These gases are formed in numerous stages of the pulp process, e.g., at the digester plant and liquor evaporation. The unpleasant sulphur compounds are most usually removed by combusting the malodorous gases in either a lime kiln or in a separate combustor. During combustion all sulphurous substances are oxidized into sulphur dioxide and are entrained with the flue gases. Sulphur dioxide is also formed in other stages of the manufacture of pulp, e.g., in recovery boilers.

There are two primary types of methods for removing sulphur dioxide from flue gases of different combustion plants, namely dry and wet methods. In the former, sulphur dioxide is removed with an absorbent and in the latter the flue gases are washed with water or alkaline solution in a venturi scrubber or an absorption column. In pulp mills the sulphur dioxide-containing gases have been washed with water, secondary condensate, or dilute white liquor. The washing liquids are usually introduced subsequent to the causticizing plant. Thus the sulphidity of the liquor can be controlled while recovering sulphur. However, the sulphur thus recovered can only be reutilized in the production of cooking liquor.

It is also known that sulphur dioxide can be separated from sulphur dioxide-containing gases by utilizing sodium sulphite as washing liquid, so that the following reaction takes place during the absorption:

$$SO_2 + Na_2SO_3 + H_2O \rightarrow 2\ NaHSO_3 \qquad (1)$$

By thermally decomposing the sodium bisulphite in an evaporation-crystallizer the sodium sulphite can be regenerated and then returned to the absorber.

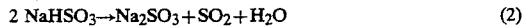

$$2\ NaHSO_3 \rightarrow Na_2SO_3 + SO_2 + H_2O \qquad (2)$$

The evaporation-crystallization process produces a mixture of steam and sulphur dioxide and a precipitate-containing residual solution of sodium sulphite/sulphate and undecomposed NaHSO3. When the water is condensed from the mixture of steam/SO2, the product is a gas with a high SO2 content, from which sulphur can be recovered and used for other purposes as desired. The problem of known evaporation-crystallization methods has been the tendency of the sodium sulphite to crystallize on the heat transfer surfaces, in which case the process will have to be interrupted for washing the heat transfer surfaces, unless a spare apparatus is available (which is normally an economically undesirable solution).

According to the present invention, there is provided a method of recovering concentrated sulphur dioxide from the chemical circulation of a pulp mill, which sulphur dioxide can be used as desired. The invention utilizes absorption, and according to the invention the absorption solution is regenerated simply and cost effectively so as not to disturb the recovery process.

The method according to the invention comprises the following steps of: (a) bringing sulphur-containing flue gas into absorptive contact with a washing solution containing sodium sulphite, so that a sodium bisulphite-containing solution is formed; (b) effecting thermal decomposition of the sodium bisulphite-containing solution to produce water in the form of steam mixed with sulphur dioxide, and sodium sulphite, the sodium sulphite crystallized from the solution; (c) using the sodium sulphite crystals from step (b) as the washing solution in step (a); and (d) recovering sulphur dioxide from the mixture of steam and sulphur dioxide produced in step (b). Step (a) is practised in absorption apparatus and step (b) is an evaporation crystallizer.

Preferably the mixture of steam and sulphur dioxide is withdrawn from the evaporator and the pressure and temperature of the steam elevated. Then the steam is redirected to the evaporator as heating steam, the steam being condensed and the incondensable sulphur dioxide-containing gases being recovered from the evaporator.

The sulphur dioxide-containing gas from, for example, a lime kiln or a separate combustor for malodorous gases is washed with a sodium sulphite-containing washing solution in a venturi scrubber or a column of the packed tower or plate tower type, all known per se. The concentration of the sodium sulphite solution used in the absorption stage is about 10–20%, preferably about 15% calculated as NaOH. The temperature is about 65°–70° C. Sulphur dioxide is absorbed into the washing solution, whereby sodium bisulphite is formed.

The spent absorption solution is directed into the evaporator for regeneration, the evaporator preferably comprising a lamella evaporator operating pursuant to the falling film principle. The evaporator is divided into two compartments, in the first of which dilute solution is treated and in the second of which concentrated solution is treated. The washing solution from the scrubber is introduced into the first compartment and the solution evaporated in the first compartment is returned to the second compartment for additional evaporation. The advantage of this arrangement is that if the crystalline sodium sulphite produced in the evaporator starts to precipitate on the heat transfer surfaces, the feed of the absorption solution from the scrubber can be changed so as to be directed into this compartment. Thus, the dilute solution removes the precipitation, if any, from the heat transfer surfaces.

The solution to be regenerated is introduced to the upper end of the lamellas, from which it flows down on the outer surfaces thereof. The sodium sulphite crystallizes as the bisulphite is thermally decomposed and the solution is concentrated.

The sulphur dioxide formed during the evaporation of the bisulphite solution is exhausted from the evaporator with the steam separated from the solution. The pressure and temperature of the exhausted steam is elevated so that it can be used as heating steam in the evaporator. The steam is introduced into the lamellas, in which it is condensed. The incondensable steam is directed to the post-condensing surface of the evaporator. This surface is formed of a small portion of the lamellas, into which the non-condensed steam from the larger portion of the lamellas is fed. The steam is fed from the top. From there the incondensable sulphur dioxide gas is directed to a separate condenser, located outside the evaporator, in order to recover concentrated sulphur dioxide. The sulphur dioxide gas can be used in the production of chlorine dioxide, it can liquefied or it can be further treated to form, for example, sulphuric acid or elemental sulphur.

The condensates produced in both compartments of the evaporator are combined with the solution containing sodium sulphite crystals, so that the sodium sulphite crystals are dissolved, and the produced sodium sulphite solution is returned to the absorption stage.

The method according to the invention enables an effective separation of sulphur dioxide and its recovery as concentrated sulphur dioxide, which in turn enables the sulphur dioxide to be subsequently used in a number of different forms.

The invention also comprises the following apparatus for recovering sulphur dioxide from the chemical circulation of a cellulose pulp mill, comprising: (a) an absorption apparatus for cleaning sulphur dioxide-containing flue gases; (b) means for introducing the flue gases to the absorption apparatus and for withdrawing gases therefrom; (c) means for withdrawing absorption solution from the absorption apparatus; (d) an evaporation-crystallization apparatus for regenerating absorption solution; (e) means for direction absorption solution into said evaporation-crystallization apparatus; (f) means for withdrawing the absorption solution from the evaporation-crystallization apparatus; (g) a mixing vessel for dissolving crystals contained in absorption solution; (h) means for withdrawing absorption solution from the mixing vessel and redirecting it to the absorption apparatus; (i) means for withdrawing the sulphur dioxide gas from the evaporation-crystallization apparatus; and (j) a condenser and means for withdrawing concentrated sulphur dioxide therefrom. Further, the apparatus according to the invention the evaporation-crystallization apparatus comprises means for withdrawing product steam from the evaporator, means for elevating the pressure and temperature of the steam, means for redirecting the elevated pressure and temperature steam to the evaporator as heating steam, and means for directing the product condensates to the mixing vessel.

According to a preferred embodiment of the invention the evaporation-crystallization apparatus is a falling film evaporator having heat transfer means comprising lamellas, the evaporator divided into at least two compartments, both capable of receiving solution to be treated.

DETAILED DESCRIPTION OF THE DRAWINGS

Figure 1:
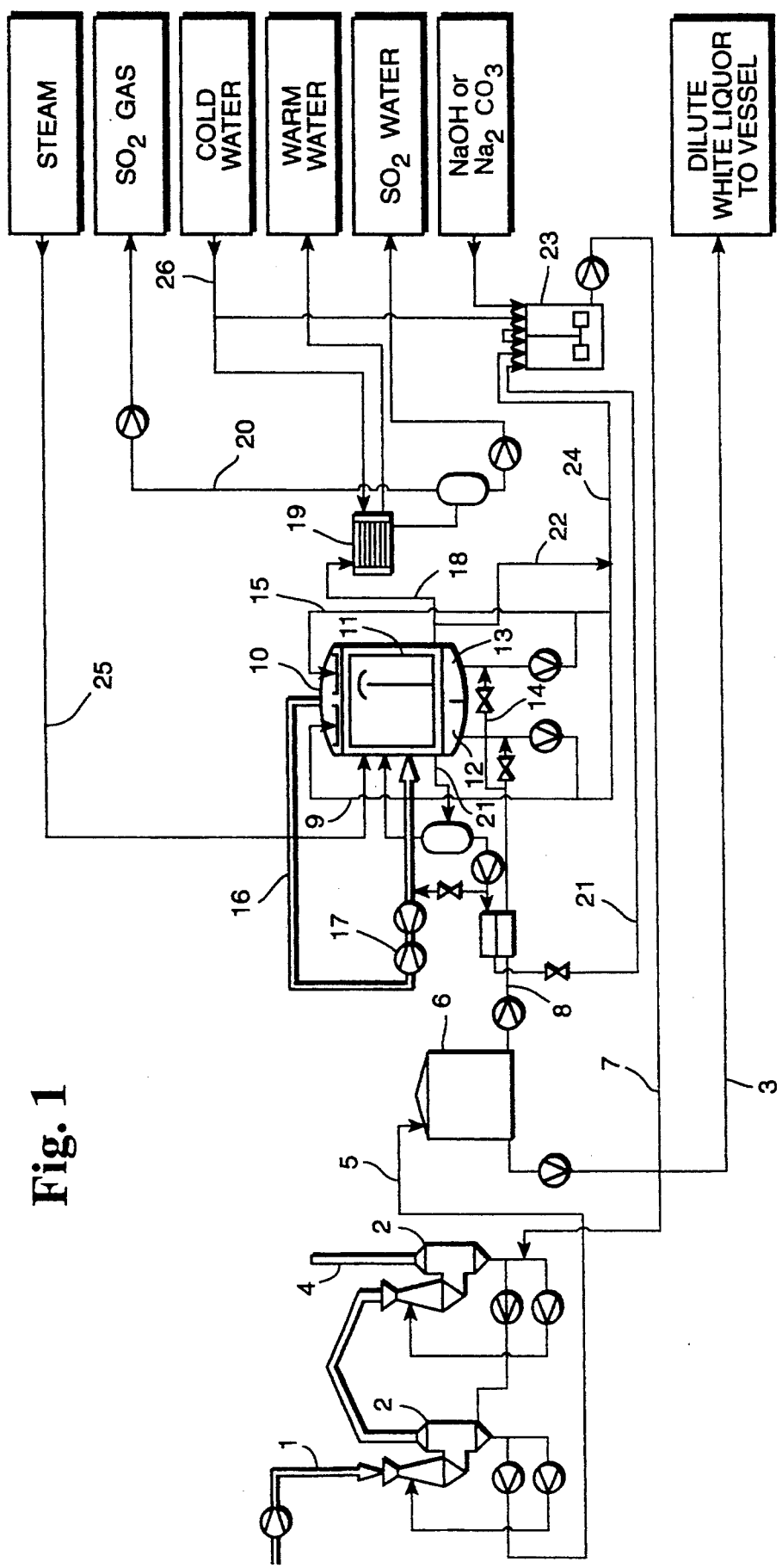
FIG. 1 is a schematic view of exemplary apparatus according to the present invention.

A sulphur dioxide-containing flue gas from, e.g., a lime kiln, is directed via line 1 to conventional venturi scrubbers 2. A sodium sulphite-containing absorption solution is introduced into the scrubbers via line 3. The cleaned gas, directed through two scrubbers, is exhausted into the atmosphere via stack 4. Having absorbed the sulphur dioxide, the absorption solution is directed to an intermediate vessel 6 via line 5. This enables both the addition of a portion of the sodium bisulphite solution into white liquor via line 7 and the removal of the sodium sulphate produced in the absorption stage.

The solution to be regenerated is introduced through lines 8 and 9 into the compartment 12 via the upper portion of the evaporator 10. The heat transfer means 11 of the evaporator 10 consists of lamellas. The liquid to be evaporated flows on the outer surface of the lamellas, in a falling film whereas the heating steam flows inside the lamellas. A portion of the solution from the bottom of the compartment 12 is redirected to the upper portion of the compartment 12, and the rest is directed to compartment 13, in which the liquid is evaporated further. In order to effect washing of the lamella of heat transfer means when needed, the order of feed can be changed and the liquid to be regenerated can initially be introduced into compartment 13 via lines 8, 14 and 15.

Both the steam separated from the solution in the evaporator 10 and the product sulphur dioxide are withdrawn from the evaporator 10 via line 16 into compressor 17 to elevate the temperature and pressure of the steam. The steam mixture is introduced into most of the lamellas in heat transfer means 11 as heating steam from below. Thus the steam contacts its own condensate, which causes a stripping effect to take place. From here the uncondensed steam enters a smaller portion of the lamellas from above, and both the condensate and incondensable gases are withdrawn from the lower portion of heat transfer means 11. Fresh steam can be added via line 25 at the beginning of the process and when needed.

The incondensable sulphur dioxide gases are directed through line 18 to condenser 19, in which the main portion of the steam is condensed, and the remaining incondensable gas in line 20 is concentrated sulphur dioxide, the sulphur dioxide content of which can be controlled by controlling the temperature of the condenser 19. The recovered sulphur dioxide gas can be used as described above.

From the lamellas of heat transfer means 11, the condensates are directed along lines 21 and 22 to a mixing vessel 23, into which also a solution containing concentrated sodium sulphite crystals is introduced via line 24, as well as water (via line 26) for dissolving the crystals thereby to form a new absorption liquid, which is circulated to flue gas scrubbing.

The method and apparatus according to the invention enable the sulphur to be recovered effectively when a lamella evaporator is used as the evaporation-crystallization apparatus in the manner described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of recovering sulphur dioxide from a chemical recovery circulation loop of a cellulose pulp mill, comprising the steps of:
   a) bringing sulphur-containing flue gas from a cellulose pulp mill into absorptive contact with a washing solution containing sodium sulphite, so that a sodium bisulphite-containing solution is formed;
   b) utilizing a falling film evaporator, effecting thermal decomposition of the sodium bisulphite-containing solution to produce water in the form of steam mixed with sulphur dioxide, and sodium sulphite, the sodium sulphite crystallized from the solution;

c) using the sodium sulphite crystals from step (b) as the washing solution in step (a) by dissolving the crystals to form a washing solution;

d) recovering sulphur dioxide from the mixture of steam and sulphur dioxide produced in step (b);

wherein the evaporator is divided at least into first and second compartments containing lamella heat transfer surfaces, and wherein step (b) is practiced by passing the sodium bisulfite-containing solution from step (a) into the first compartment, and then passing at least some remaining solution after evaporation in the first compartment to the second compartment; and (e) in response to the initiation of crystalline sodium sulphite precipitation on the transfer surfaces of the second compartment, practicing step (b) to pass the sodium bisulfite-containing solution from step (a) into the second compartment first, to remove the precipitation.

2. A method as recited in claim 1 wherein step (a) is practiced using absorption apparatus.

3. A method as recited in claim 2 comprising the further step of directing uncondensed sulfur dioxide gas from the evaporator to a separate condenser for recovery of concentrated sulfur dioxide gas.

4. A method as recited in claim 2 wherein the sulfur dioxide from step (d) is used in the production of chlorine dioxide for pulp bleaching.

5. A method as recited in claim 1 comprising the further step of using the sulfur dioxide recovered in step (d) in the pulp mill.

6. A method as recited in claim 5 comprising the further step of directing uncondensed sulfur dioxide gas from the evaporator to a separate condenser for recovery of concentrated sulfur dioxide gas.

7. A method as recited in claim 1 comprising the further step of directing uncondensed sulfur dioxide gas from the evaporator to a separate condenser for recovery of concentrated sulfur dioxide gas.

8. A method as recited in claim 7 wherein the sulfur dioxide from step (d) is used in the production of chlorine dioxide for pulp bleaching.

9. A method as recited in claim 1 wherein the sulfur dioxide from step (d) is used in the production of chlorine dioxide for pulp bleaching.

* * * * *